United States Patent
Girsova et al.

(10) Patent No.: US 11,074,726 B2
(45) Date of Patent: Jul. 27, 2021

(54) TECHNIQUES FOR AUTOMATICALLY MITIGATING OVERLAPPING LABELS ASSOCIATED WITH PIE CHARTS

(71) Applicant: Apple Inc., Cupertino, CA (US)

(72) Inventors: Elizaveta Girsova, Mountain View, CA (US); Chao-Kuo Lin, Campbell, CA (US); Michael D. Trent, Sunnyvale, CA (US); Jonathan Cho, San Francisco, CA (US); Lorraine S. Shim, Santa Clara, CA (US); Ryan M. Olshavsky, San Jose, CA (US); Andrew L. Harding, Portola Valley, CA (US); Brian J. Rupert, Wexford, PA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/718,787

(22) Filed: Sep. 28, 2017

(65) Prior Publication Data

US 2018/0260986 A1   Sep. 13, 2018

Related U.S. Application Data

(60) Provisional application No. 62/469,452, filed on Mar. 9, 2017.

(51) Int. Cl.
| | |
|---|---|
| *G06T 11/20* | (2006.01) |
| *G06T 3/60* | (2006.01) |
| *G06T 3/20* | (2006.01) |
| *G06T 11/60* | (2006.01) |
| *G06T 3/40* | (2006.01) |

(52) U.S. Cl.
CPC .............. *G06T 11/206* (2013.01); *G06T 3/20* (2013.01); *G06T 3/60* (2013.01); *G06T 11/60* (2013.01); *G06T 3/40* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 5,442,741 A | 8/1995 | Hughes et al. | |
| 7,292,244 B2 * | 11/2007 | Vafiadis | G06F 17/24 345/440 |
| 9,142,050 B2 | 9/2015 | Jain et al. | |
| 2006/0082594 A1 * | 4/2006 | Vafiadis | G06F 17/24 345/629 |
| 2006/0200759 A1 * | 9/2006 | Agrawala | G06F 40/103 715/209 |

(Continued)

OTHER PUBLICATIONS

"Working with Microsoft enterprise chart, dashboard and reporting technologies", Overlapping Labels on a Pie Chart, https://betterdashboards.wordpress.com/2009/01/20/overlapping-labels-on-a-pie-chart/ (Year: 2009).*

(Continued)

*Primary Examiner* — Nurun N Flora
(74) *Attorney, Agent, or Firm* — Dickinson Wright RLLP

(57) ABSTRACT

Disclosed herein are techniques for automatically mitigating overlapping labels associated with pie charts. In particular, the techniques involve migrating positions of the labels in response to adjustments of the pie chart to ensure that the labels are distributed in a non-overlapping, uniform, and aesthetically-pleasing manner.

20 Claims, 15 Drawing Sheets

(56) References Cited

U.S. PATENT DOCUMENTS

| | | | | |
|---|---|---|---|---|
| 2007/0061751 | A1* | 3/2007 | Cory | G06Q 10/10 |
| | | | | 715/804 |
| 2010/0253686 | A1* | 10/2010 | Alsbury | G06T 11/206 |
| | | | | 345/440 |
| 2014/0362085 | A1* | 12/2014 | Jain | G06T 11/206 |
| | | | | 345/440 |

OTHER PUBLICATIONS

Of "Using pie charts and doughnut charts in Excel" (https://www.officetooltips.com/exceL2016/tips/using_pie_charts_and_doughnuLcharts_in_excel.html in wayback machine 2016; (Year: 2016).*

JpGraph Manual, Chapter 16, figs. 16.11-16.13; https://jpgraph.net/download/manuals/chunkhtml/ch16.html , year 2010 in wayback machine: https://web.archive.org/web/201001010000007https://jpgraph.net/download/manuals/chunkhtml/ch16.html (Year: 2010).*

How to resolve overlapping date labels in Pie and Doughnut Charts?, link—http://support.nevron.com/KB/a131/overlapping-labels-in-pie-and-doughnut-charts.aspx, Article ID: 131, Created On: Nov. 19, 2010, Modified: Dec. 1, 2010 (Year: 2010).*

* cited by examiner

Step 4: For overlapping labels that span across the top / bottom quandrants: shift all labels in the top half up, and shift all labels in the bottom half down.

Result: Overlapping label conflicts have been eliminated.

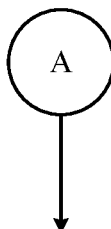

WHEN A FIRST ADDITIONAL OVERLAP OCCURS BETWEEN (I) A BOTTOM-MOST LABEL OF THE TOP HALF OF THE LEFT SIDE OF THE PIE CHART, AND (II) A TOP-MOST LABEL OF THE BOTTOM HALF OF THE LEFT SIDE OF THE PIE CHART:
(1) MIGRATING (I) THE BOTTOM-MOST LABEL, AND ALL LABELS DISPOSED ABOVE (I) THE BOTTOM-MOST LABEL, IN AN UPWARD DIRECTION, AND
MIGRATING (II) THE TOP-MOST LABEL, AND ALL LABELS DISPOSED BELOW (II) THE TOP-MOST LABEL, IN A DOWNWARD DIRECTION, TO ELIMINATE THE FIRST ADDITIONAL OVERLAP
410

WHEN A SECOND ADDITIONAL OVERLAP OCCURS BETWEEN (III) A BOTTOM-MOST LABEL OF THE TOP HALF OF THE RIGHT SIDE OF THE PIE CHART, AND (IV) A TOP-MOST LABEL OF THE BOTTOM HALF OF THE RIGHT SIDE OF THE PIE CHART:
MIGRATING (III) THE BOTTOM-MOST LABEL, AND ALL LABELS DISPOSED ABOVE (III) THE BOTTOM-MOST LABEL, IN AN UPWARD DIRECTION, AND
MIGRATING (IV) THE TOP-MOST LABEL, AND ALL LABELS DISPOSED BELOW (IV) THE TOP-MOST LABEL, IN A DOWNWARD DIRECTION, TO ELIMINATE THE SECOND ADDITIONAL OVERLAP
412

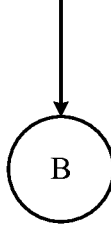

*FIG. 4B*

TECHNIQUES FOR AUTOMATICALLY MITIGATING OVERLAPPING LABELS ASSOCIATED WITH PIE CHARTS

CROSS-REFERENCE TO RELATED APPLICATIONS

The present application claims the benefit of U.S. Provisional Application No. 62/469,452, entitled "TECHNIQUES FOR AUTOMATICALLY MITIGATING OVERLAPPING LABELS ASSOCIATED WITH PIE CHARTS," filed Mar. 9, 2017, the content of which is incorporated herein by reference in its entirety for all purposes.

FIELD OF INVENTION

The embodiments described herein set forth techniques for automatically mitigating overlapping labels associated with pie charts. In particular, the techniques involve migrating positions of the labels in response to adjustments of the pie chart to ensure that the labels are distributed in a non-overlapping, uniform, and aesthetically-pleasing manner.

BACKGROUND

Pie charts are a popular choice for presenting a visual representation of a collection of data (e.g., sales metrics). In some cases, different operations applied to a pie chart—e.g., a rotation of the pie chart, an adjustment of labels within the pie chart, etc.—can lead to visual artifacts that are displeasing to users. For example, positions/sizes of labels linked to different wedges of the pie chart can frequently change based on the above-described operations, and can result in one or more label overlaps that need to be manually resolved via user input (e.g., manual relocations of the labels). Moreover, in some cases, pie chart applications do not permit users to adjust the positions of the different elements of the pie chart, which typically forces users to undergo the cumbersome process of tampering with built-in techniques (e.g., rotating the pie chart, changing a distance of the labels from the center of the pie chart, etc.) until the overlaps are mitigated. Unfortunately, this process can result in a final layout that is undesirable to the user—or, worse, can even result in a situation where the built-in techniques are exhausted yet overlapping labels remain intact.

SUMMARY OF INVENTION

Accordingly, representative embodiments set forth herein disclose techniques for automatically mitigating overlapping labels associated with pie charts. In particular, the techniques involve migrating positions of the labels in response to adjustments of the pie chart to ensure that the labels are distributed in a non-overlapping, uniform, and aesthetically-pleasing manner.

One embodiment sets forth a method for automatically distributing labels associated with pie charts to prevent overlaps of the labels. In particular, the method involves a first step of (1) obtaining access to a pie chart that includes a plurality of labels, where each label of the plurality of labels: (i) corresponds to a respective wedge of the pie chart, and (ii) is disposed on a left side or a right side of the pie chart. Next, the method involves a second step of (2) receiving a notification that a modification is made to the pie chart, where the modification causes at least one overlap of at least two labels of the plurality of labels. Next, the method involves performing the following third step when the at least two labels are located in a top half of the pie chart: (3) migrating each label of the at least two labels upward, and in a top-down order, to eliminate the at least one overlap, where a bottom-most label of the at least two labels is excepted from the migration. This third step can be separately carried out in isolation for both the left side and the right side of the pie chart (in the top half). Finally, the method involves performing the following fourth step when the at least two labels are located in a bottom half of the pie chart: (4) migrating each label of the at least two labels downward, and in a bottom-up order, to eliminate the at least one overlap, where a top-most label of the at least two labels is excepted from the migration. This fourth step can be separately carried out in isolation for both the left side and the right side of the pie chart (in the bottom half).

The foregoing method can include additional steps to further-mitigate any overlapping labels that might remain at the conclusion of the foregoing steps. In particular, the method can further involve, when a first additional overlap occurs between (i) a bottom-most label of the top half of the left side of the pie chart, and (ii) a top-most label of the bottom half of the left side of the pie chart: migrating (i) the bottom-most label, and all labels disposed above (i) the bottom-most label, in an upward direction, and migrating (ii) the top-most label, and all labels disposed below (ii) the top-most label, in a downward direction, to eliminate the first additional overlap.

Additionally, the foregoing method can further involve, when a second additional overlap occurs between (iii) a bottom-most label of the top half of the right side of the pie chart, and (iv) a top-most label of the bottom half of the right side of the pie chart: migrating (iii) the bottom-most label, and all labels disposed above (iii) the bottom-most label, in an upward direction, and migrating (iv) the top-most label, and all labels disposed below (iv) the top-most label, in a downward direction, to eliminate the second additional overlap.

At the conclusion of the foregoing method steps, the labels associated with the pie chart are distributed in a non-overlapping, aesthetically-pleasing manner, thereby providing a substantial feature improvement to users.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 4A-4C illustrate a method for carrying out the overlap mitigation algorithm described herein, according to some embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

The embodiments described herein set forth techniques for automatically mitigating overlapping labels associated with a pie chart. Such overlaps can be the result of, for example, adjusting a distance of at least one of the labels from a center point of the pie chart, adjusting a distance of at least one wedge of the pie chart from the center point of the pie chart, adjusting a rotation angle of the pie chart, and so on. Additional causes for overlaps can include adjusting the text included within at least one of the labels of the pie chart, e.g., font properties, paragraph properties, etc., which can cause change in the size/shape of a bounding box that surrounds at least one of the labels. To mitigate such overlaps, the embodiments described herein set forth an overlap mitigation algorithm that migrates positions of the labels to result in a distribution that is uniform, aesthetically-pleasing, and overlap-free. A more detailed description of the overlap mitigation algorithm, and the manner in which it can be implemented, is provided below in conjunction with FIGS. 1, 2A-2E, 3A-3E, 4A-4C, and 5.

Figure 1:
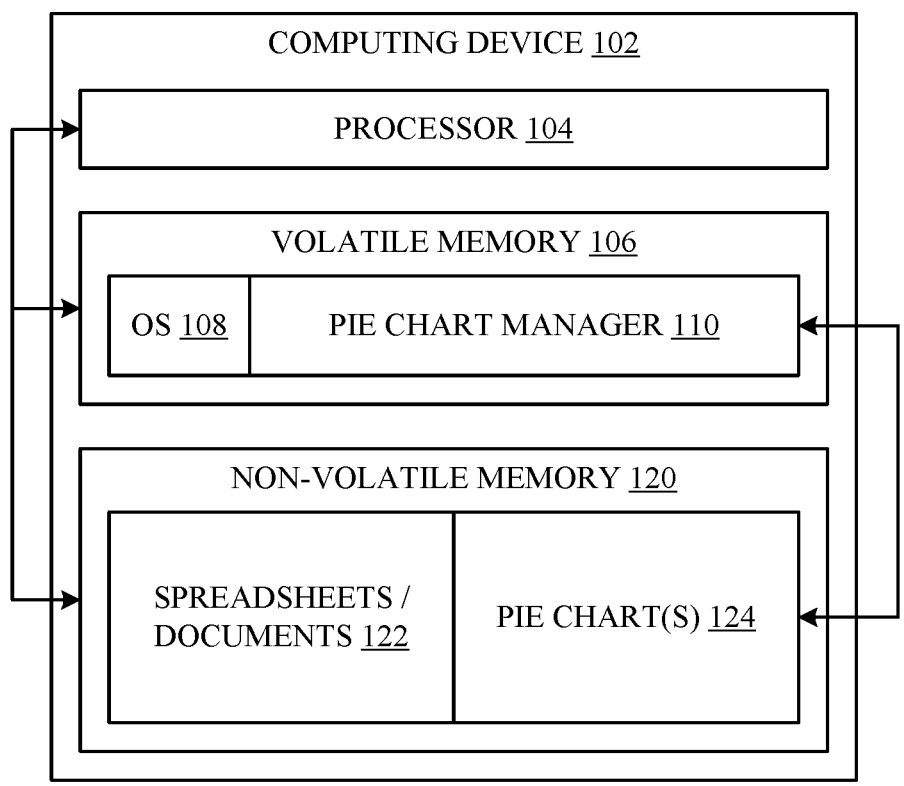
FIG. 1 illustrates a high-level overview of a computing device that can be configured to perform the various techniques described herein, according to some embodiments.
Figure 5:
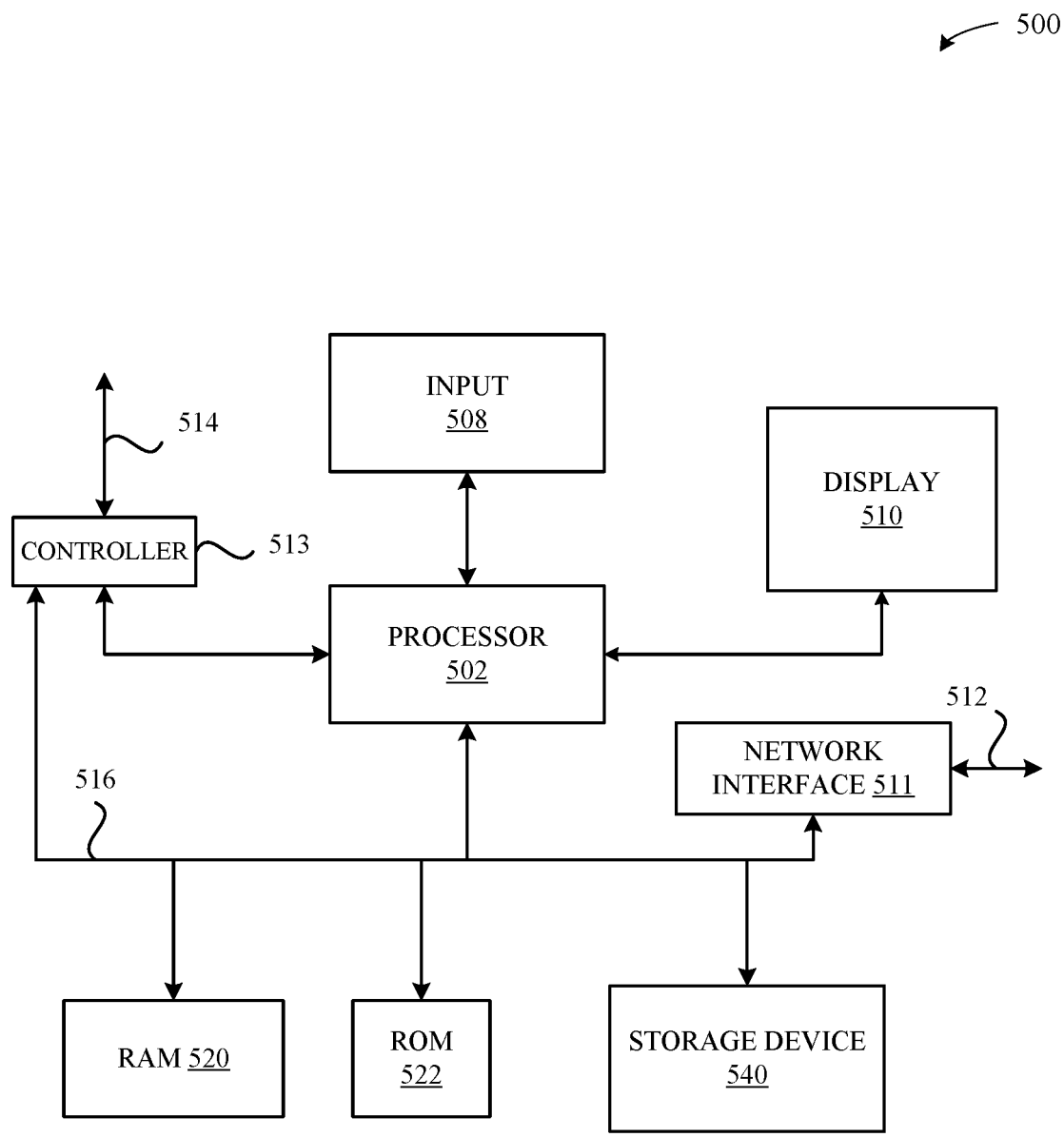
FIG. 5 illustrates a detailed view of a computing device that can be used to implement the various techniques described herein, according to some embodiments.

FIG. 1 illustrates a high-level overview 100 of a computing device 102 that can be configured to perform the various techniques described herein. As shown in FIG. 1, the computing device 102 can include a processor 104, a volatile memory 106 (e.g., a Random-Access Memory (RAM)), and a non-volatile memory 120 (e.g., a storage device). It is noted that a more detailed breakdown of example hardware components that can be included in the computing device 102 is illustrated in FIG. 5, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) 108 can be loaded into the volatile memory 106, where the OS 108 can execute a variety of applications that collectively enable the various techniques described herein to be implemented. As described in greater detail herein, such applications can include a pie chart manager 110 that is specifically configured to carry out operations on different pie charts, e.g., pie charts 124 associated with spreadsheets/documents 122 stored in the non-volatile memory 120.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2E, 3A-3E, and 4A-4C.

Figure 2A:
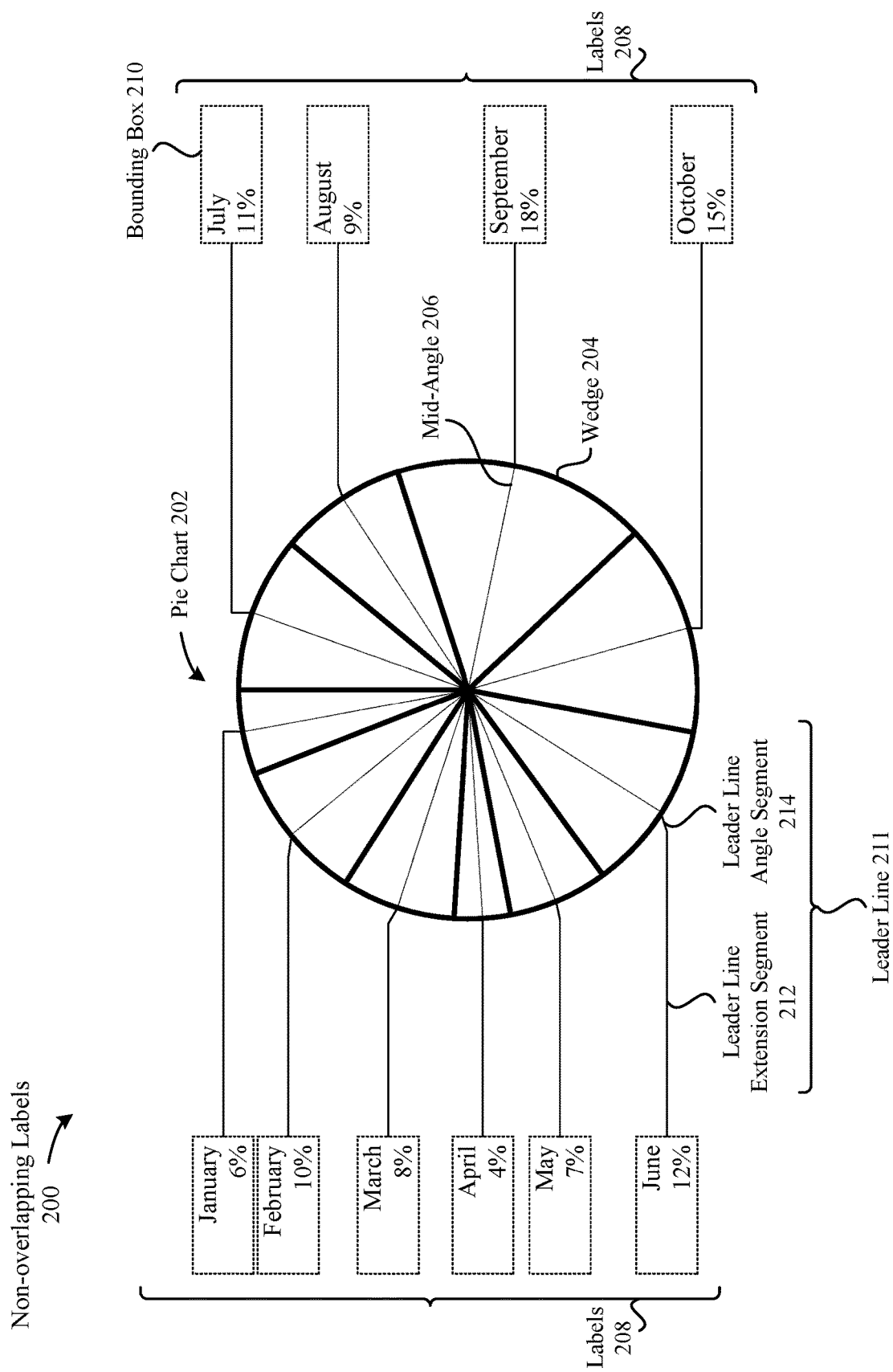
FIGS. 2A-2E illustrate conceptual diagrams of example scenarios in which overlaps can occur between labels of a pie chart, according to some embodiments.
Figure 2B:
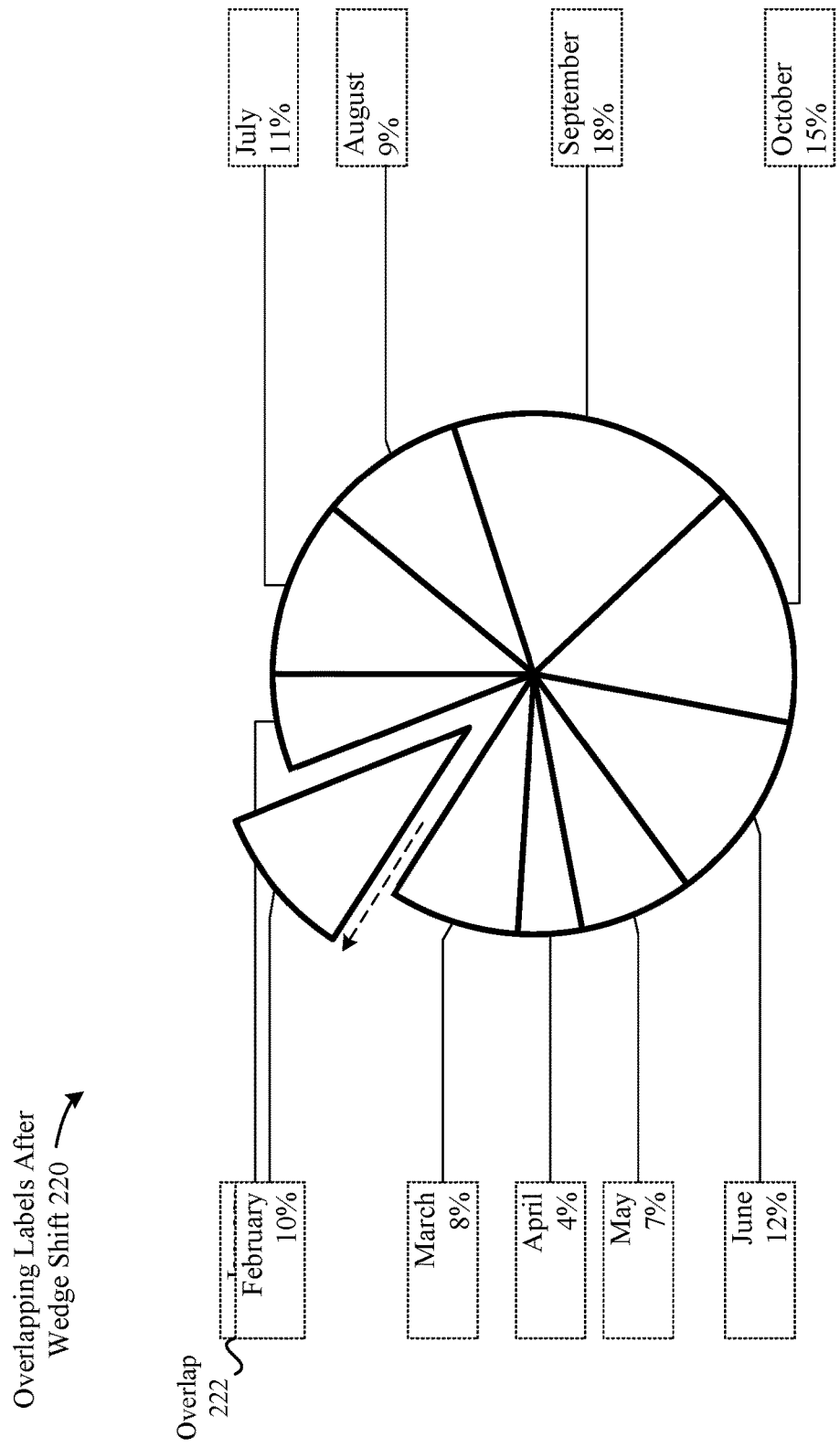
Figure 2C:
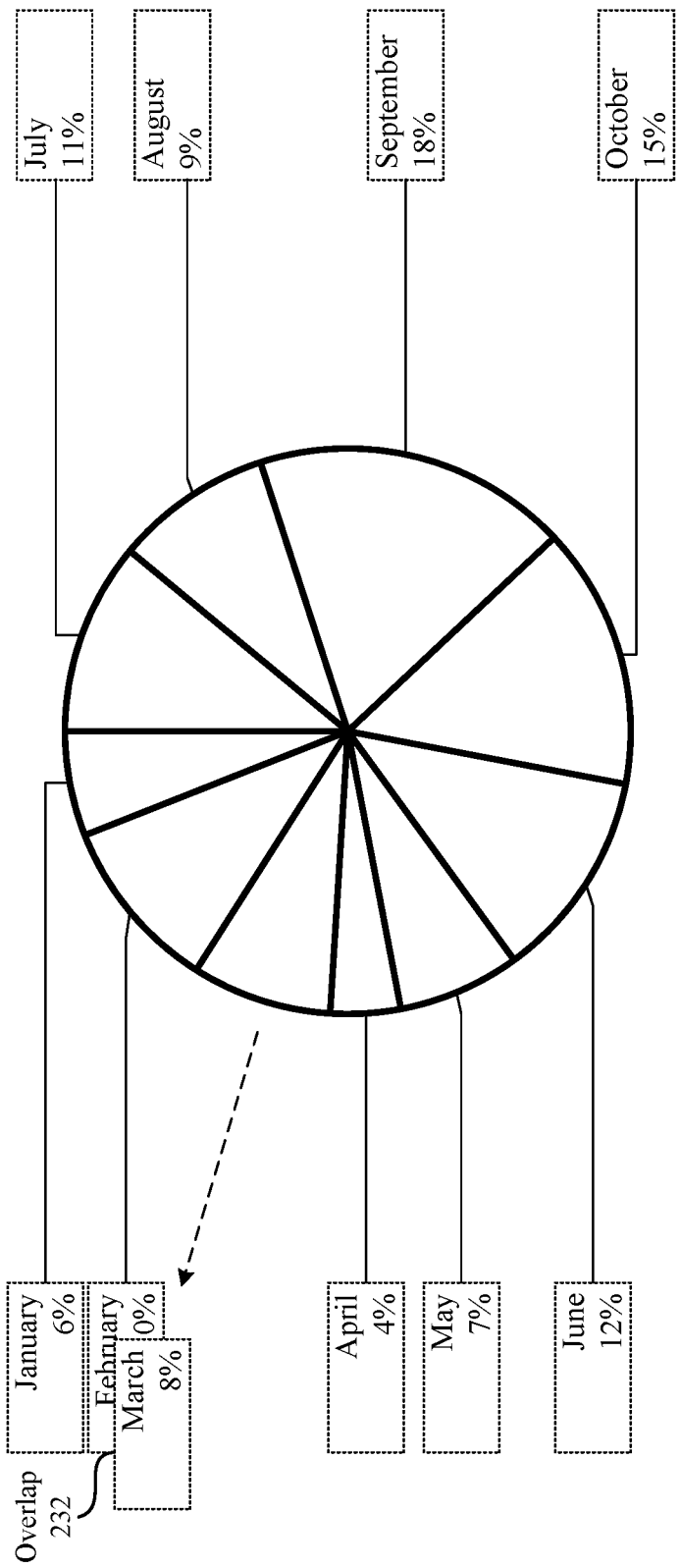
Figure 2D:
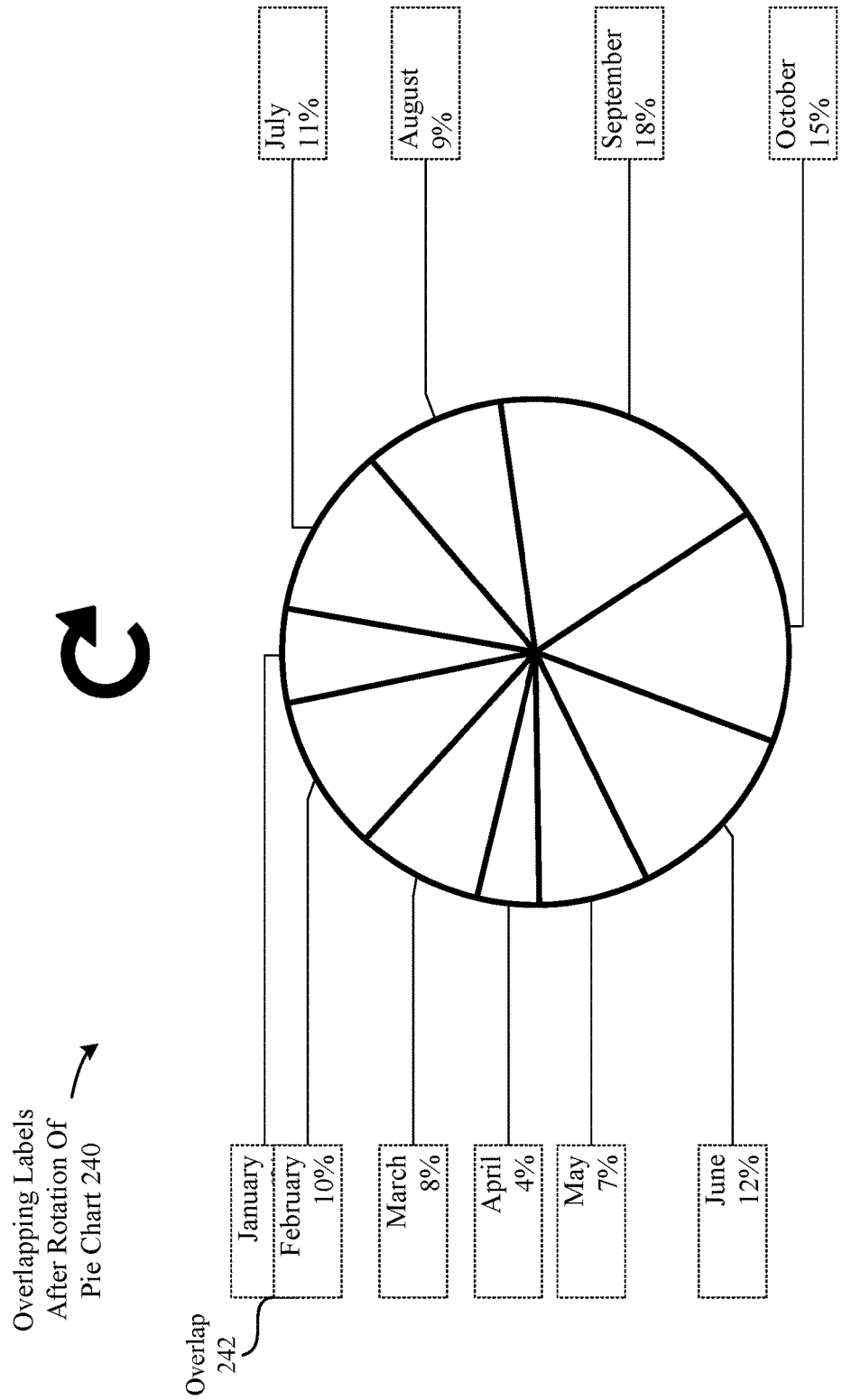
Figure 2E:
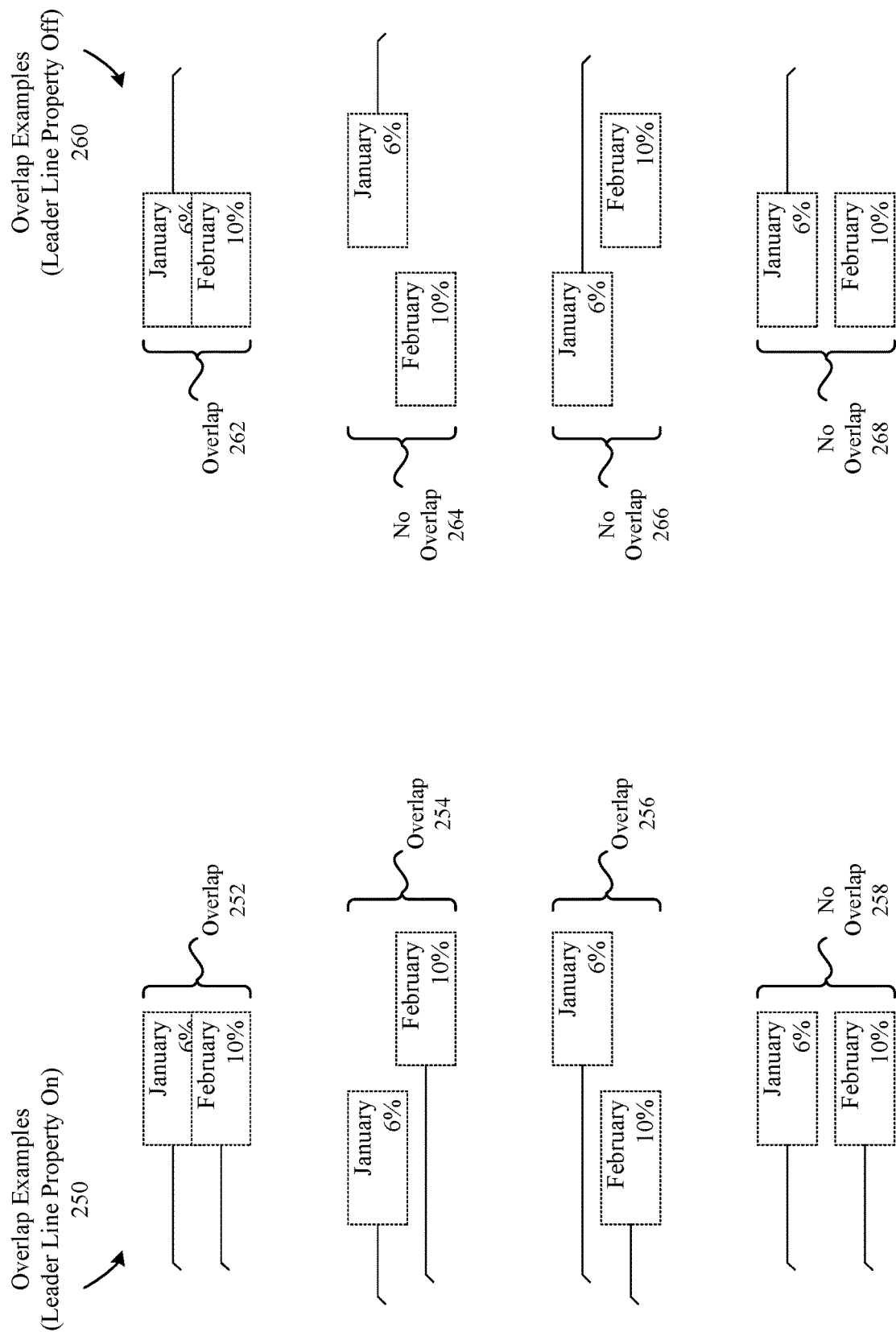

FIGS. 2A-2E illustrate conceptual diagrams of example scenarios in which overlaps can occur between labels of a pie chart, according to some embodiments. Specifically, FIG. 2A illustrates an initial scenario of non-overlapping labels 200, where multiple labels 208 associated with a pie chart 202 are in an overlap-free state. FIG. 2A also serves as a breakdown of different elements that can belong to the pie chart 202 that enable the pie chart 202 to provide a comprehensive/understandable visual representation of a collection of data (e.g., data included in a spreadsheet/document 122). In contrast, FIGS. 2B-2D illustrate example scenarios 220, 230, and 240, in which the pie chart 202—or the elements belonging to the pie chart 202 (e.g., labels 208, wedges 204, etc.)—are modified in a manner that results in at least one overlap of at least two labels 208. Additionally, FIG. 2E illustrates example scenarios in which the pie chart manager 110 identifies overlapping labels 208 in accordance with specialized properties assigned to the labels 208, which are described below in greater detail.

As shown in FIG. 2A, each label 208 can be disposed on a left side or a right side of the pie chart 202, where the label 208 corresponds to a particular wedge 204 within the pie chart 202. It is noted that the techniques described herein are not limited to scenarios in which the labels are only disposed on the left side or the right side of the pie chart. On the contrary, the techniques described herein can be applied to other organizational layouts (e.g., radial layout, top bottom layout, etc.) of the labels 208 (with the appropriate adjustments to the overlap mitigation algorithm described herein) without departing from the scope of this disclosure. According to some embodiments, each label 208 and its corresponding wedge 204 are linked via a leader line 211 that is composed of a leader line extension segment 212 and a leader line angle segment 214. According to some embodiments, a default position for each label 208 and its corresponding leader line 211 can be based on a mid-angle 206 of the wedge 204 to which the label 208 corresponds. As shown in FIG. 2A, the mid-angle 206 of a particular wedge 204 can be formed by drawing a line through the middle of the wedge 204 such that the line is disposed equidistantly from each straight edge of the wedge 204. For example, if two straight edges of a given wedge 204 form a forty-degree angle, then a line can be drawn at a twenty-degree angle (to either of the two straight edges) to form the mid-angle 206. It is noted that the mid-angles 206 typically are not visible when the pie chart 202 is displayed at the computing device 102 (e.g., via a display device), and that the mid-angles 206 are illustrated throughout different ones of the FIGS. merely to provide a more detailed breakdown of the organizational relationship between the labels 208, the leader lines 211, and the wedges 204.

As additionally shown in FIG. 2A, each label 208 can include a corresponding bounding box 210 that defines an amount of space that surrounds the text content of the label 208. In particular, and as described in greater detail herein, the bounding box 210 represents an area that can be utilized by the overlap mitigation algorithm to identify whether labels 208 are considered to be overlapping. A more detailed explanation regarding how such bounding boxes 210 can be utilized to identify overlaps is described below in greater detail in conjunction with FIG. 2E. According to some embodiments, the size/shapes of the bounding boxes 210 can be adjusted in accordance with appearance properties of the text within the bounding boxes 210. For example, font properties, paragraph properties, padding properties, etc., can be adjusted to affect the manner in which the bounding boxes 210 surround the labels 208. Moreover, the size/shapes of the bounding boxes 210 can be directly adjusted (e.g., independent of the text included therein) to artificially control the distances between the labels 208 that result after the overlap mitigation techniques (described in greater detail below) are executed.

As noted above, FIGS. 2B-2D illustrate different example scenarios in which elements belonging to the pie chart 202—specifically, the wedges 204—can be modified a manner that causes at least one overlap of at least two labels 208 to occur. In particular, and as shown in FIG. 2B, when a position of an individual wedge 204 is shifted outward from a center point of the pie chart 202, a position of the label 208 titled "February 10%" can be correspondingly shifted outward as well. Consequently, the bounding box 210 of the label 208 titled "February 10%" overlaps the bounding box 210 of the label 208 titled "January 6%", and establishes the overlap 222. This can be problematic as the label 208 titled "January 6%" is partially obstructed and is aesthetically unpleasing. It is noted that the illustration in FIG. 2B merely represents a consequential overlap of two labels 208 based on a single wedge 204 movement, and that any similar adjustments of the wedges 204 can establish similar or additional overlaps between the labels 208. For example, instead of shifting the position of an individual wedge 204, the pie chart manager 110 can shift all of the wedges 204 (e.g., in response to a user request) belonging to the pie chart 202 in an outward or an inward direction—which, as can be understood from the foregoing description and illustration provided in FIG. 2B, can result in overlaps of labels 208 in a variety of areas.

Additionally, as shown in FIG. 2C, overlaps can occur when a distance of an individual label 208 is shifted outward from a tip of the corresponding wedge 204 (e.g., with respect to a center point of the pie chart 202). For example, in FIG. 2C, when the label 208 titled "March 8%" is shifted outward, an overlap 232 is established with the label 208 titled "February 10". It is noted that the example shown in FIG. 2C involves selectively turning off a leader line property (associated with the label 208 titled "March 8%") for including a leader line 211 between the label 208 and its corresponding wedge 204, and that this option can be toggled (for any of the labels 208), e.g., in accordance with user preferences. Again, it is noted that the illustration in FIG. 2C merely represents an example overlap occurring based on label 208 movements, and that any similar adjustments of the labels 208 can establish similar/additional overlaps between the labels 208. For example, the pie chart manager 110 can increase the distances between all of the labels 208 and their corresponding wedges 204 (e.g., in response to a user request)—which, as can be understood from the foregoing description and illustration provided in FIG. 2C, can result in overlaps of labels 208 in a variety of areas. In another example, the pie chart manager 110 can adjust the properties associated with the text of one or more of the labels 208 to cause a change in the size and/or shape of the bounding box 210, which also can establish overlaps of labels 208 in a variety of areas.

Additionally, as shown in FIG. 2D, overlaps can occur when the pie chart 202 is rotated, e.g., in a clock-wise or a counter-clockwise direction. For example, in FIG. 2D, the pie chart 202 is rotated clockwise by ten degrees (with respect to the pie chart 202 illustrated in FIG. 2A), which causes the positions of the labels 208 to change and result in overlaps, e.g., the overlap 242 between the label 208 titled "February 10%" and the label 208 titled "January 6%". Again, it is noted that the illustration in FIG. 2D merely represents an example cause for an overlap to occur based on a rotation of the pie chart 202 itself, and that any similar adjustments can establish similar/additional overlaps between the labels 208. For example, the pie chart manager 110 can rotate the labels 208 themselves, the wedges 204 themselves, and/or the pie chart 202 in any direction, which can potentially result in overlaps of labels 208 in a variety of areas.

Additionally, FIG. 2E illustrates conceptual diagrams 250 and 260 that identify different manners in which the pie chart manager 110 identifies whether labels 208 are overlapping. As shown in FIG. 2E, properties associated with the different labels 208—e.g., the above-described leader line properties—can influence whether the pie chart manager 110 identifies two or more labels 208 as overlapping. Specifically, the conceptual diagram 250 illustrates different example distributions of two different labels 208 whose leader line properties are set to "on," and the manner in which the pie chart manager 110 identifies the different distributions as overlapping or non-overlapping. For example, as illustrated by the different overlap examples 252, 254, 256, and 258, the two labels 208 are identified as overlapping labels any time their respective bounding boxes 210 encroach one another in the vertical dimension (e.g., the overlaps 252, 254, and 256)—even when the bounding boxes 210 themselves do not intersect one another (e.g., the overlaps 254 and 256). Alternatively, the conceptual diagram 260 illustrates the same example distributions of two different labels 208, only in this case, the label 208 titled "January 6%" has a leader line property set to "on," and the label 208 titled "February 10%" has a leader line property set to "off." As illustrated by the different overlap examples 262, 264, 266, and 268, the two labels 208 are identified as overlapping labels only if their respective bounding boxes 210 intersect one another (e.g., the overlap 262). Accordingly, the pie chart manager 110 can be configured to consider the different properties of the labels 208 when carrying out the overlap mitigation algorithm described below in conjunction with FIGS. 3A-3E (as such properties directly affect whether labels 208 are considered to be overlapping and need to be fixed).

Accordingly, FIGS. 2B-2E illustrate conceptual diagrams of different example scenarios in which the labels of a pie chart can become overlapped. To cure such overlaps, the pie chart manager 110 can be configured to carry out an overlap mitigation algorithm, which is described below in greater detail in conjunction with FIGS. 3A-3E.

FIGS. 3A-3E illustrate conceptual diagrams of different steps involved in an overlap mitigation algorithm 300, according to some embodiments. According to some embodiments, the pie chart manager 110 can be configured to carry out the overlap mitigation algorithm 300 in response to any adjustment made (e.g., as described above in conjunction with FIGS. 2B-2D) to the pie chart 202 to ensure that the labels 208 do not overlap one another and are distributed in an aesthetically-pleasing manner.

Figure 3A:
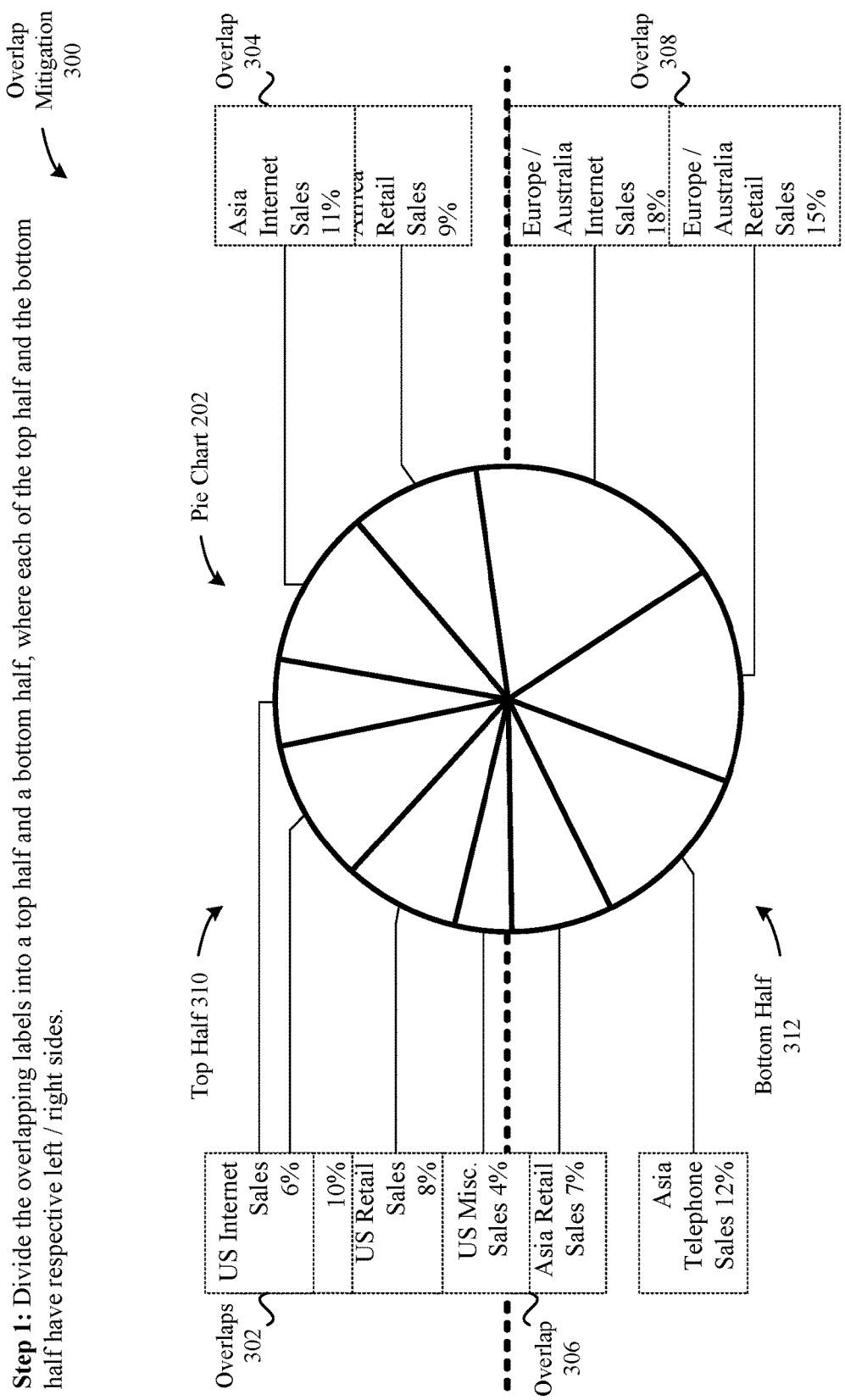
FIGS. 3A-3E illustrate conceptual diagrams of different steps involved in an overlap mitigation algorithm, according to some embodiments.

FIG. 3A illustrates an initial state of the pie chart 202 having ten different labels 208, where various overlaps 302, 304, 306, and 308 exist across the labels 208. The state of the pie chart 202 illustrated in FIG. 3A can occur, for example, after the pie chart manager 110 carries out instructions to rotate the pie chart 202 (and thereby cause the overlaps). In another example, the state of the pie chart 202 illustrated in FIG. 3A can occur when the text of the labels 208 is expanded to include additional descriptive content that causes the bounding boxes 210 of the labels 208 to increase in size (and thereby cause the overlaps). In any case, a first step of the overlap mitigation algorithm 300 involves identifying the overlapping labels 208 and associating them with one of two sections of the pie chart 202: a top half 310 (having left/right sides), and a bottom half 312 (having left/right sides).

As shown in FIG. 3A, the top half 310 and the bottom half 312 can be separated by a line that runs horizontally through the center of the pie chart 202 that evenly separates the top half 310 and the bottom half 312. In accordance with FIG. 3A, the pie chart manager 110 associates the overlaps 302 and the overlap 304 (specifically, the labels associated those overlaps) with the top half 310, where the overlaps 302 fall on the left side of the top half 310, and the overlap 304 falls on the right side of the top half 310. Moreover, the pie chart manager 110 associates the overlap 308 (specifically, the labels associated with this overlap) with the right side of the bottom half 312. Additionally, while the overlap 306 is associated with the left side of the pie chart 202, the overlap exists between two different labels 208 that are split between the top half 310/bottom half 312 of the pie chart. In that regard, the pie chart manager 110 can be configured to handle the overlap 306 in a specialized manner that is described below in greater detail in conjunction with FIG. 3D. As described in greater detail herein, the foregoing categorizations of the labels 208 (i.e., into top-left, top-right, bottom-left, and bottom-right areas of the pie chart 202) are carried out in order to logically separate the problematic (i.e., overlapping) labels 208 so that they can be processed in a manner that mitigates the overlap issues, which is described below in greater detail in conjunction with FIGS. 3B-3D.

Figure 3B:
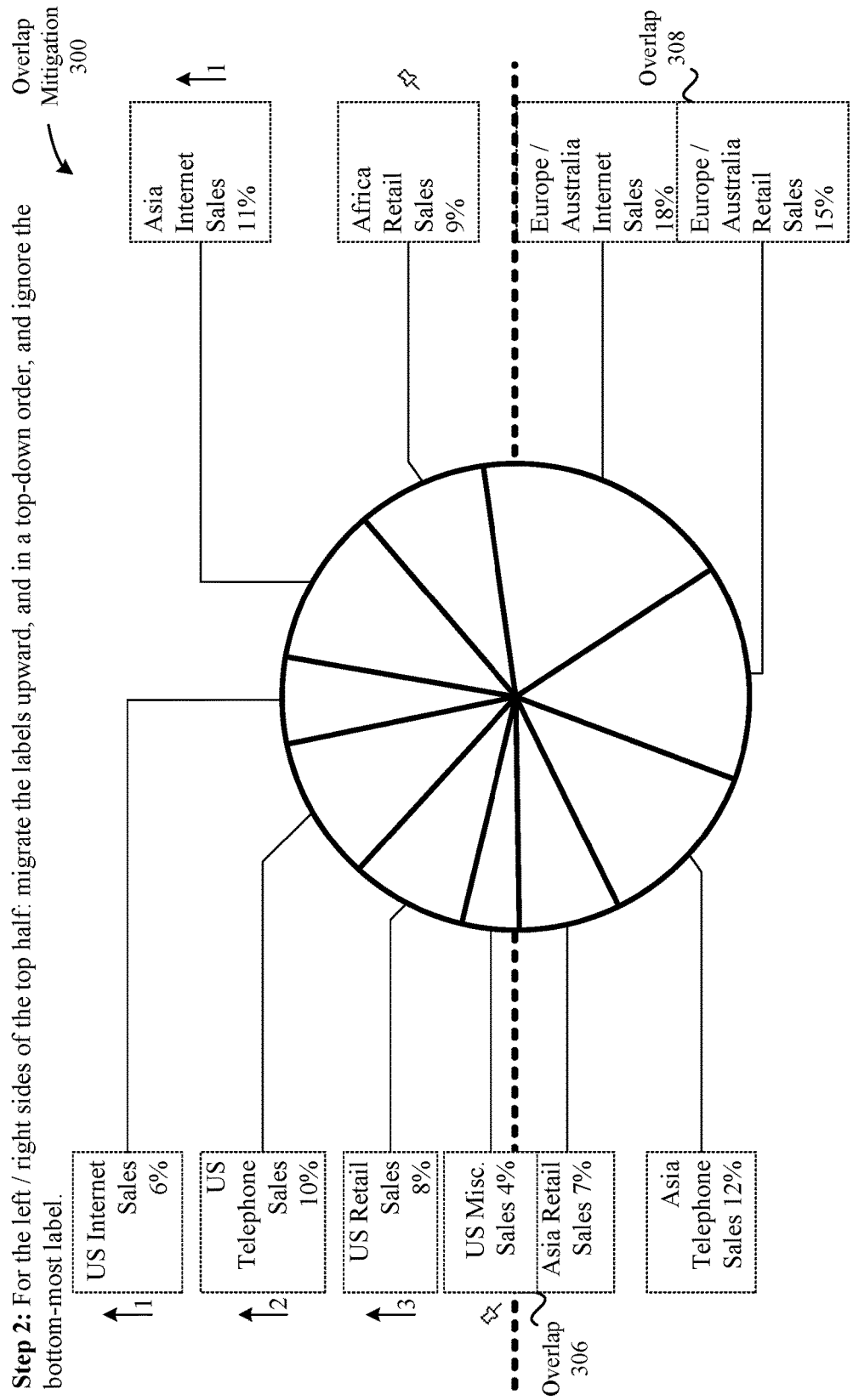

FIG. 3B illustrates a second step of the overlap mitigation algorithm 300, which involves migrating the overlapping labels 208 that are associated with the left/right sides of the top half 310 of the pie chart 202. According to some embodiments, the pie chart manager 110 can be configured to first operate on the overlapping labels 208 located on the left side (of the top half 310) of the pie chart 202. However, it is noted that this is not a requirement, and that the pie chart manager 110 can be configured to first operate on the overlapping labels 208 located on the right side (of the top half 310) of the pie chart 202 without affecting the overall outcome of the overlap mitigation algorithm 300. In any case, and as shown in FIG. 3B, the pie chart manager 110 can be configured to migrate each of the overlapping labels 208 in an upward direction, and in a top-down order, where the bottom-most label 208 is excepted from the migration. For example, on the left side of the pie chart 202, the pie chart manager 110 first migrates the label 208 titled "US Internet Sales 6%" upward, then migrates the label 208 titled "US Telephone Sales 10%", and finally migrates the label 208 titled "US Retail Sales 8%", while ignoring the label 208 titled "US Misc. Sales 4%" (as it is the bottom-most label 208). It is noted that the pie chart manager 110 can be configured to perform the migrations in a space-efficient manner that minimizes the overall distances of the migrations to ensure the labels do not sit far outside of view from the pie chart 202. For example, the pie chart manager 110 can be configured to honor a ceiling height not to be surpassed by the top of the bounding box 210 of the top-most label 208 in the top half 310. Moreover, the ceiling height—along with the heights of the bounding boxes 210—can act as a basis for the overall target separation distance to be intact when the labels 208 are repositioned by way of the migrations.

Additionally, and as shown in FIG. 3B, on the right side of the pie chart 202, the pie chart manager 110 first migrates the label 208 titled "Asia Internet Sales 11%", and ignores the label 208 titled "Africa Retail Sales 9%" (as it is the bottom-most label 208). At the conclusion of the second step of the overlap mitigation algorithm 300, the overlapping labels 208 associated with the top half 310 of the pie chart 202 have been migrated in a manner that mitigates the overlaps 302 and the overlap 304. However, the overlaps 306 and 308 remain intact, and are addressed by the pie chart manager 110 through additional steps of the overlap mitigation algorithm 300 described below in greater detail in conjunction with FIGS. 3C-3D.

Figure 3C:
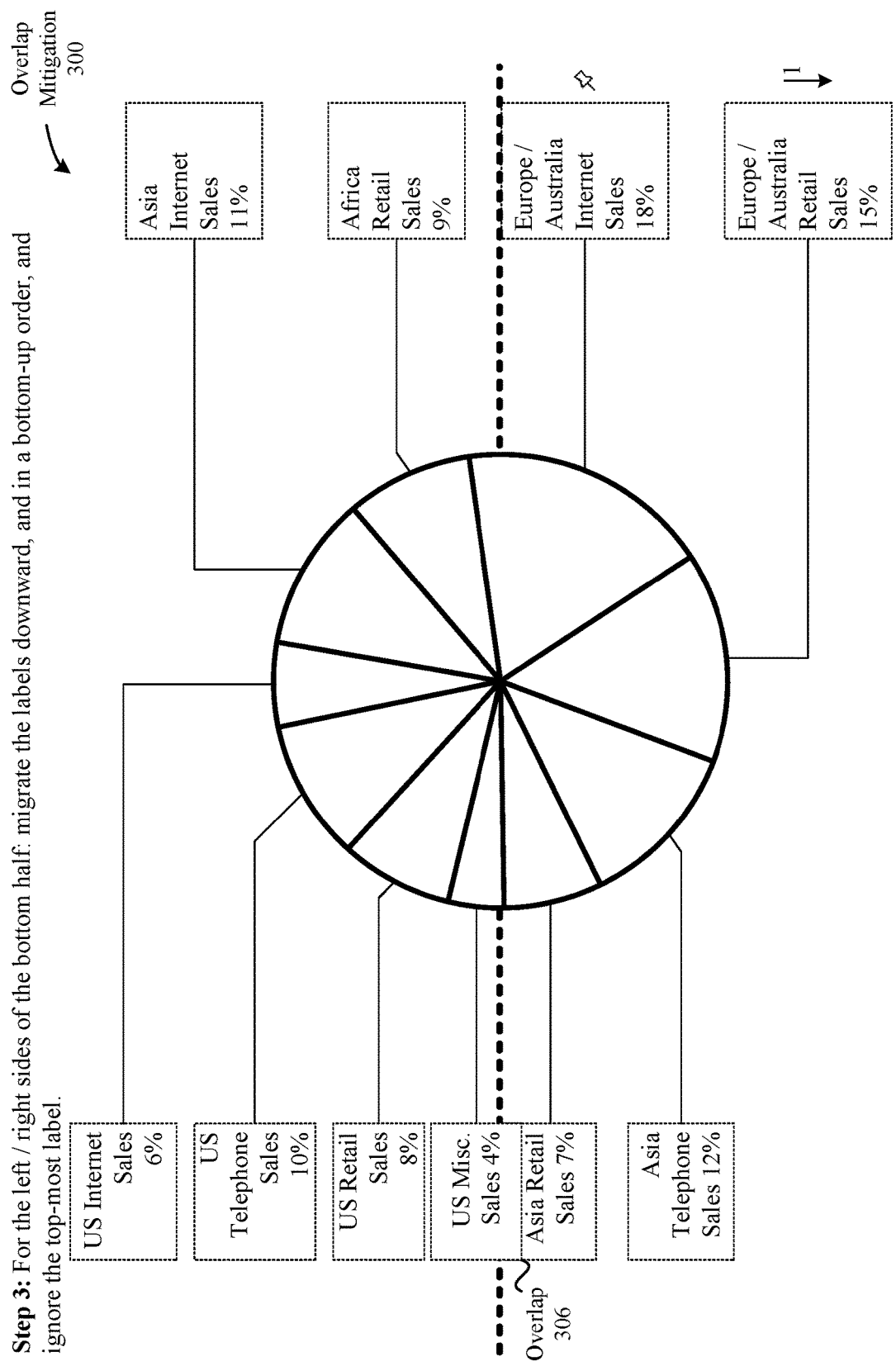

FIG. 3C illustrates a third step of the overlap mitigation algorithm 300, which involves migrating the overlapping labels 208 that are associated with the left/right sides of the bottom half 312 of the pie chart 202. As shown in FIG. 3C, the pie chart manager 110 can be configured to migrate each of the overlapping labels 208 in a downward direction, and a bottom-up order, where the top-most label 208 is excepted from the migration. In the example illustrated in FIG. 3C, there are no overlapping labels 208 on the left side of the bottom half 312 of the pie chart 202, so the pie chart manager 110 can proceed directly to processing the right side of the bottom half 312 of the pie chart 202. In particular, the pie chart manager 110 first migrates the label 208 titled "Europe/Australia Retail Sales 15%" downward, and ignores the label 208 titled "Europe/Australia Internet Sales 18%" (as it is the top-most label 208). Again, it is noted that the pie chart manager 110 can be configured to perform the migrations in a space-efficient manner that minimizes the overall distances of the migrations to ensure the labels do not sit far outside of view from the pie chart 202. Accordingly, at the conclusion of the third step of the overlap mitigation algorithm 300, the overlapping labels 208 associated with both the top half 310 of the pie chart 202 and the bottom half 312 of the pie chart 202 have been migrated in a manner that mitigates the overlaps 302, 304, and 308. However, the overlap 306 remains intact, as the label 208 titled "US Misc. Sales 4%" and the label 208 titled "Asia Retail Sales 7%" were left untouched by the pie chart manager 110 (due to their excepted bottom-most/top-most positions, respectively) during the second and third steps of the overlap mitigation algorithm 300. Accordingly, this overlap 306 is addressed by the pie chart manager 110 as described below in greater detail in conjunction with FIG. 3D.

Figure 3D:
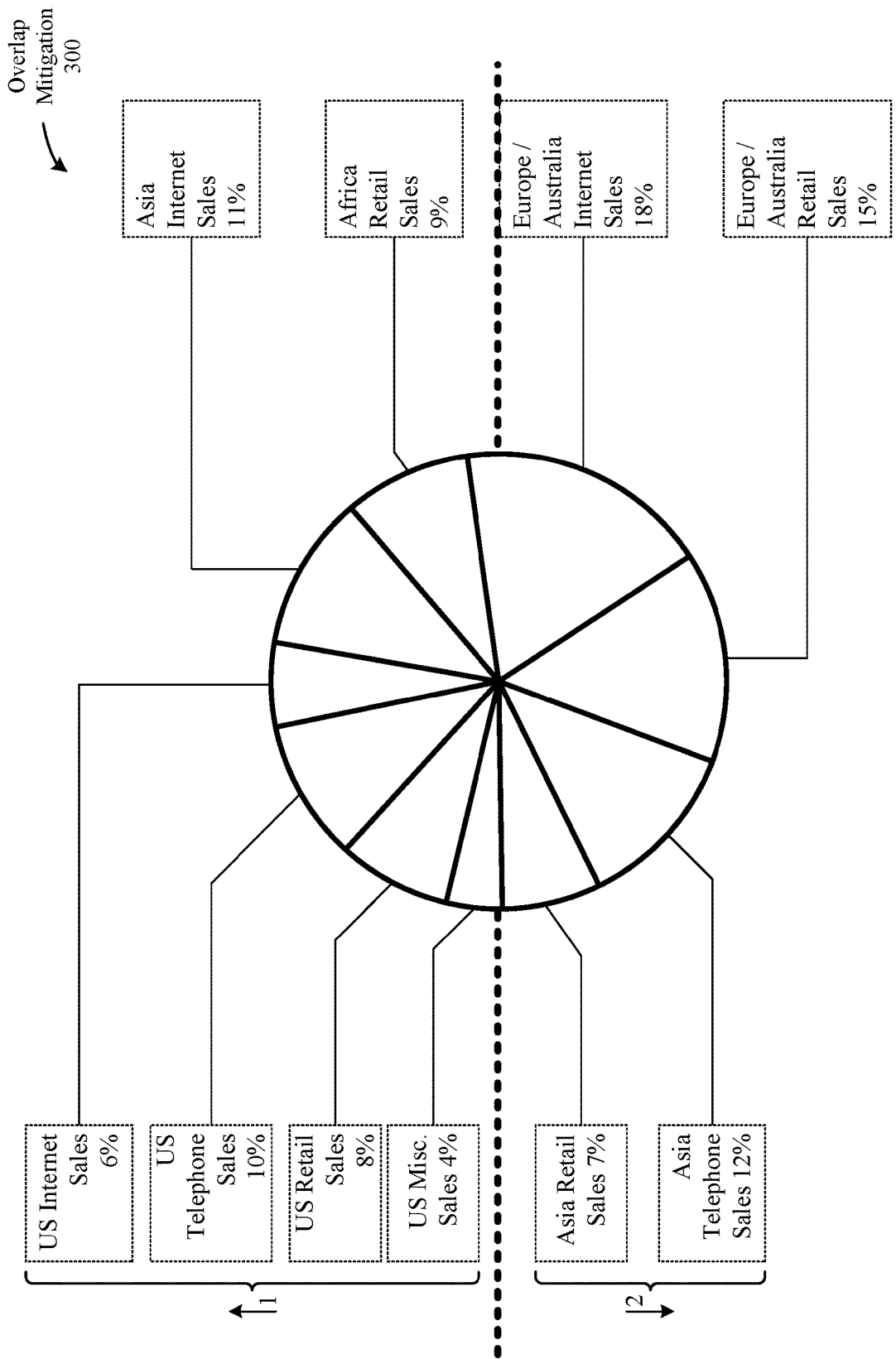

As shown in FIG. 3D, the pie chart manager 110 can be configured to carry out a fourth step to mitigate the overlap 306 between the label 208 titled "US Misc. Sales 4%" and the label 208 titled "Asia Retail Sales 7%". In particular, the pie chart manager 110 can be configured to migrate the label 208 titled "US Misc. Sales 4%"—and all of the labels 208 disposed above—in an upward direction. Similarly, the pie chart manager 110 can also be configured to migrate the label 208 titled "Asia Retail Sales 7%"—and all of the labels 208 disposed below—in a downward direction. In this manner, the overlap 306 is effectively eliminated without establishing new overlaps that might occur between the labels 208 in the top half 310 or the bottom half 312 of the pie chart 202. For example, if the pie chart manager 110 only migrated the label 208 titled "US Misc. Sales 4%" upward (while ignoring the labels 208 above)—and only migrated the label 208 titled "Asia Retail Sales 7%" downward (while ignoring the labels 208 below)—then additional overlaps might otherwise be established, e.g., between the label 208 titled "US Misc. Sales 4%" and the label 208 titled "US Retail Sales 8%", and/or between the label 208 titled "Asia Retail Sales 7%" and the label 208 titled "Asia Telephone Sales 12%".

Figure 3E:
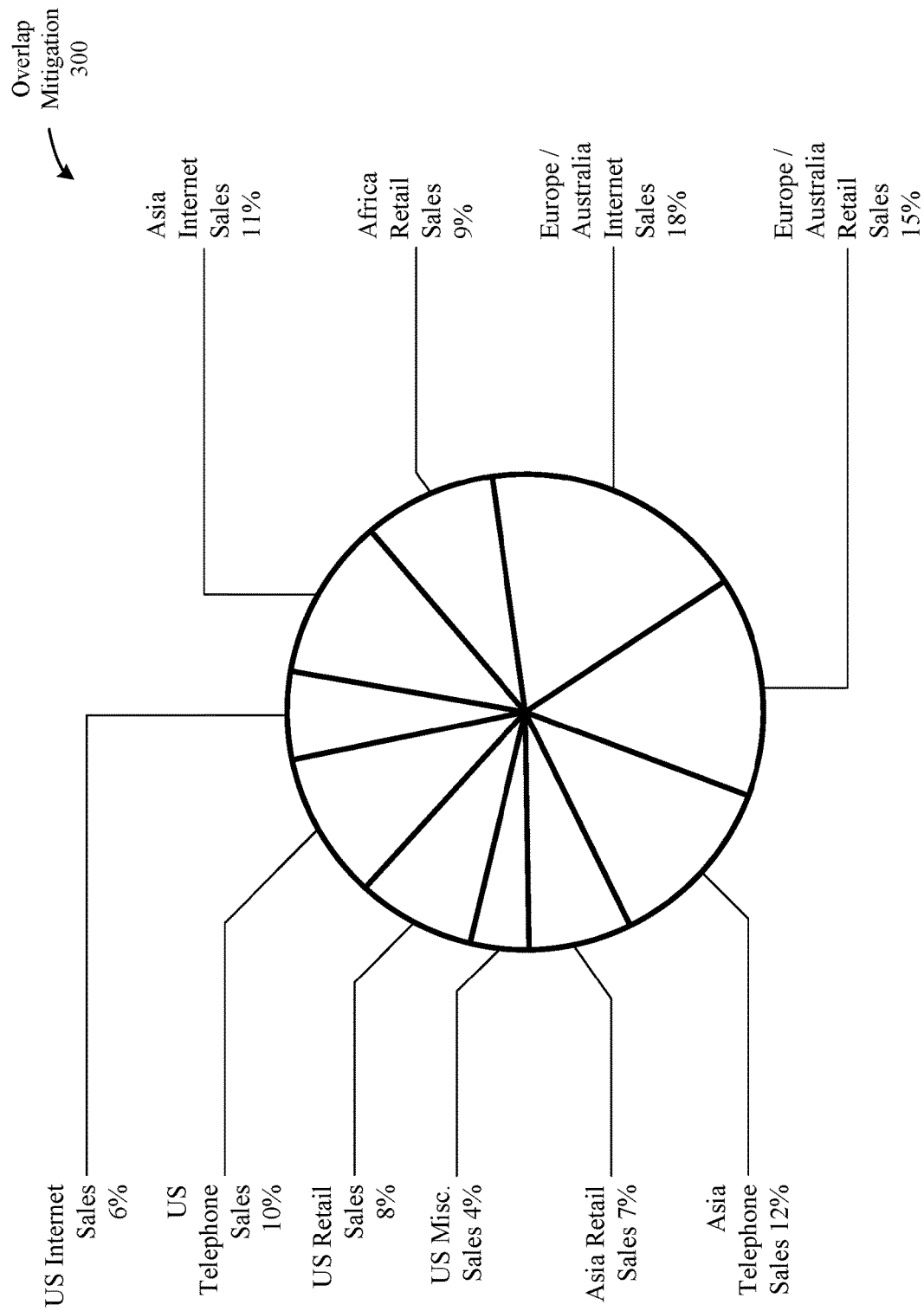

At the conclusion of the fourth step of the overlap mitigation algorithm 300, the labels 208 of the pie chart 202 are distributed in a non-overlapping, aesthetically-pleasing manner, as illustrated in FIG. 3E. It is noted that the pie chart manager 110 can be configured to perform additional checks to ensure that the leader lines 211 are drawn in a consistent manner as the labels 208 are migrated by the pie chart manager 110 when performing the overlap mitigation algorithm 300. For example, it can be desirable to ensure that the leader line angle segment 214 sits at either a zero-degree, forty-five-degree, or ninety-degree angle to the leader line extension segment 212. Moreover, it can be desirable to ensure that each leader line angle segment 214 meets a minimum length requirement under particular conditions, e.g., any time the leader line angle segment 214 is at a forty-five-degree or ninety-degree angle to the leader line extension segment 212, to maintain a uniform look across the leader lines 211 (after the overlap mitigation algorithm 300 is executed). To promote this uniformity, the pie chart manager 110 can further be configured to identify the problematic leader line angle segments 214 and perform adjustments of particular labels 208 to establish leader line angle segments 214 that satisfy the threshold length requirements. A more detailed explanation of this technique is provided below in conjunction with FIG. 4C.

Figure 4A:
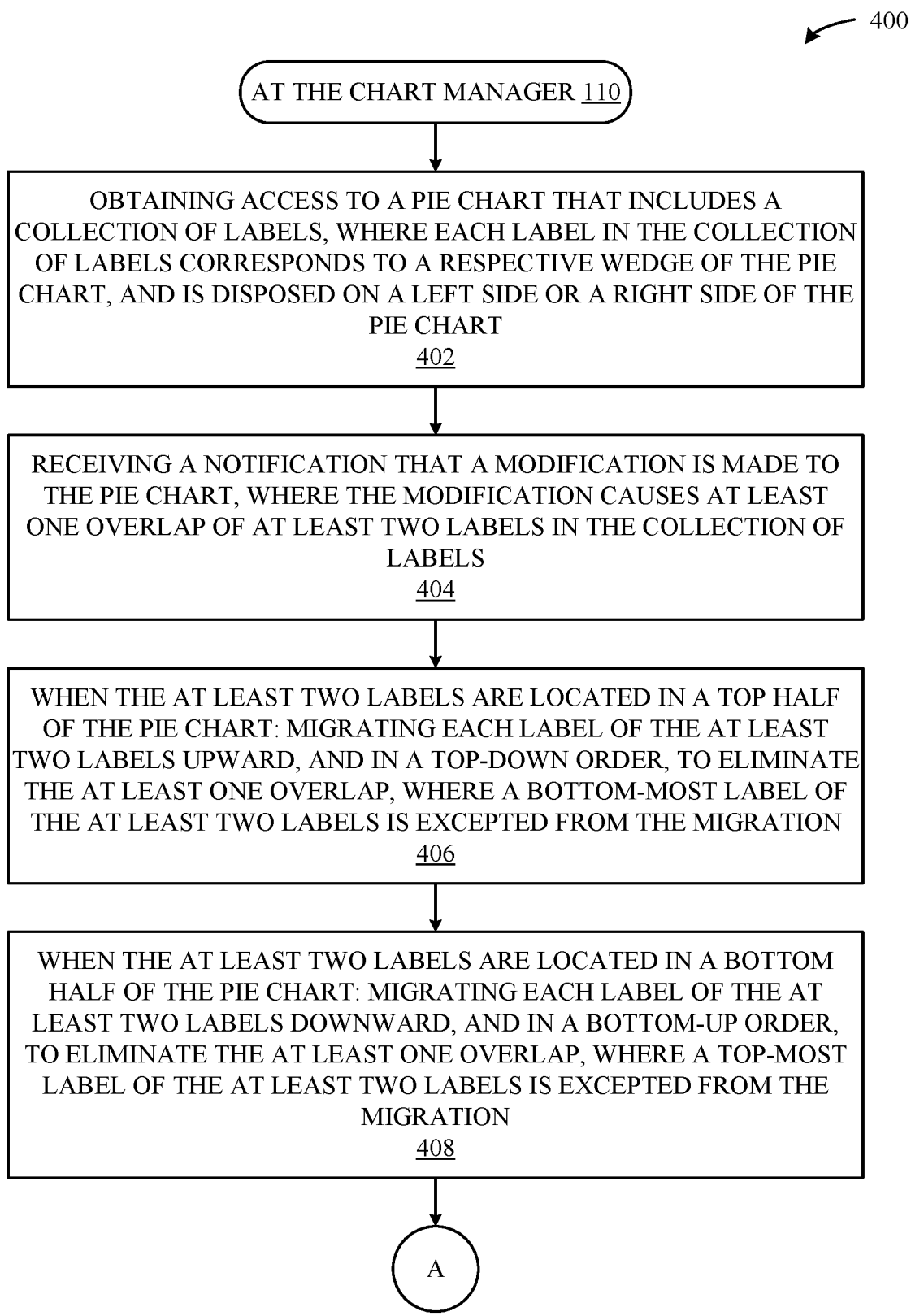
Figure 4C:
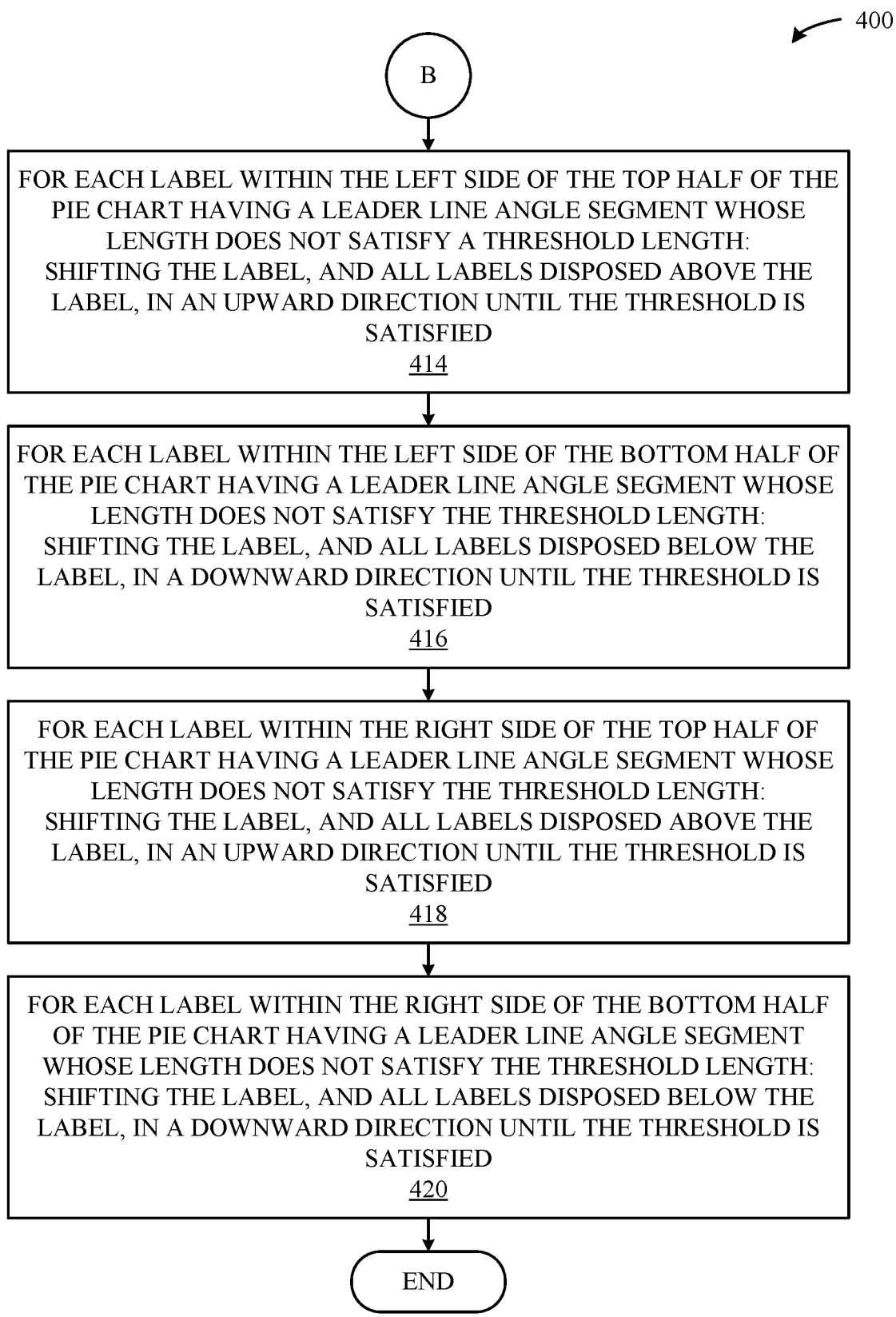

FIGS. 4A-4C illustrate a method 400 for carrying out the overlap mitigation algorithm described herein, according to some embodiments. As shown in FIG. 4A, the method 400 begins at step 402, where the pie chart manager 110 obtains access to a pie chart that includes a collection of labels. As previously described herein, each label in the collection of labels can correspond to a respective wedge of the pie chart, and is disposed on a left side or a right side of the pie chart. Again, it is noted that the techniques described herein are not limited to scenarios in which the labels are only disposed on the left side or the right side of the pie chart, and that the techniques can be applied to any organizational layout (e.g., radial layout, top side/bottom side layout, etc.) of the labels (with the appropriate adjustments to the overlap mitigation algorithm described herein). At step 404, the pie chart manager 110 receives a notification that a modification is made to the pie chart, where the modification causes at least one overlap of at least two labels of the plurality of labels (e.g., as described above in conjunction with the example scenarios illustrated in FIGS. 2B-2D in which overlaps can occur).

At step 406, the pie chart manager 110 identifies when the at least two labels are located in a top half of the pie chart. In response, the pie chart manager 110 migrates each label of the at least two labels upward, and in a top-down order, to eliminate the at least one overlap, where a bottom-most label of the at least two labels is excepted from the migration (as described above in conjunction with FIG. 3B). It is noted that step 406 can be performed separately (i.e., twice) in isolation for the left/right sides of the pie chart (in the top half) when the at least two labels include overlapping labels on both the left/right sides of the pie chart. However, when overlapping labels 208 exist on only the left side or the right side of the pie chart (in the top half), then step 406 only needs to be carried out on the appropriate side of the pie chart, thereby increasing efficiency. In this manner, only the appropriate labels are migrated in accordance with their left side or right side positioning.

Next, at step 408, the pie chart manager 110 identifies when the at least two labels are located in a bottom half of the pie chart. In response, the pie chart manager 110 migrates each label of the at least two labels downward, and in a bottom-up order, to eliminate the at least one overlap, where a top-most label of the at least two labels is excepted from the migration (as described above in conjunction with FIG. 3C). It is noted that step 408 can be performed separately (i.e., twice) in isolation for the both the left/right sides of the pie chart (in the bottom half) when the at least two labels include overlapping labels on both the left/right sides of the pie chart. However, when overlapping labels 208 exist on only the left side or the right side of the pie chart (in the bottom half), then step 408 only needs to be carried out on the appropriate side of the pie chart, thereby increasing efficiency. In this manner, only the appropriate labels are migrated in accordance with their left side or right side positioning.

Next, at step 410 of FIG. 4B, the pie chart manager 110 identifies when a first additional overlap occurs between (i) a bottom-most label of the top half of the left side of the pie chart, and (ii) a top-most label of the bottom half of the left side of the pie chart (e.g., as described above in conjunction with FIG. 3D). In response, the pie chart manager 110 migrates (i) the bottom-most label, and all labels disposed above (i) the bottom-most label, in an upward direction. Additionally, the pie chart manager 110 migrates (ii) the top-most label, and all labels disposed below (ii) the top-most label, in a downward direction, to eliminate the first additional overlap.

Next, at step 412 of as shown in FIG. 4B, the pie chart manager 110 identifies when a second additional overlap occurs between (iii) a bottom-most label of the top half of the right side of the pie chart, and (iv) a top-most label of the bottom half of the right side of the pie chart (again, as described above in conjunction with FIG. 3D). In response, the pie chart manager 110 migrates (iii) the bottom-most label, and all labels disposed above (iii) the bottom-most label, in an upward direction. Additionally, the pie chart manager 110 migrates (iv) the top-most label, and all labels disposed below (iv) the top-most label, in a downward direction, to eliminate the second additional overlap.

Additionally, steps 414-420 of FIG. 4C set forth different steps that the pie chart manager 110 can be configured to carry out to promote a uniform appearance of the leader lines 211—specifically, the leader line angle segments 214—that link the labels 208 to the pie chart 202, as described above at the conclusion of FIG. 3E. Again, these steps can be applied to any leader line angle segments 214 that are at a forty-five degree or a ninety-degree angle to the corresponding leader line extension segment 212. However, the embodiments are not limited only to these scenarios, and the pie chart manager 110 can be configured to carry out the remaining steps of the method 400 based on the satisfaction of any number of requirements for the leader line angle segments 214/leader line extension segments 212.

At step 414 of FIG. 4C, the pie chart manager 110 carries out an operation that involves, for each label within the left side of the top half of the pie chart having a leader line angle segment whose length does not satisfy a threshold length: shifting the label, and all labels disposed above the label, in an upward direction until the threshold is satisfied.

Next, at step 416 of FIG. 4C, the pie chart manager 110 carries out an operation that involves, for each label within the left side of the bottom half of the pie chart having a leader line angle segment whose length does not satisfy the threshold length: shifting the label, and all labels disposed below the label, in a downward direction until the threshold is satisfied.

Next, at step 418 of FIG. 4C, the pie chart manager 110 carries out an operation that involves, for each label within the right side of the top half of the pie chart having a leader line angle segment whose length does not satisfy the threshold length: shifting the label, and all labels disposed above the label, in an upward direction until the threshold is satisfied.

Finally, at step 420 of FIG. 4C, the pie chart manager 110 carries out an operation that involves, for each label within the right side of the bottom half of the pie chart having a leader line angle segment whose length does not satisfy the threshold length: shifting the label, and all labels disposed below the label, in a downward direction until the threshold is satisfied.

FIG. 5 illustrates a detailed view of a computing device 500 that can be used to implement the various components described herein, according to some embodiments. In particular, the detailed view illustrates various components that can be included in the computing device 102 illustrated in FIG. 1. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also include the storage device 540, which can comprise a single disk or a collection of disks (e.g., hard drives), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of applications executing on the computing device 102, including the pie chart manager 110.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A method for automatically distributing labels associated with pie charts to prevent overlaps of the labels, the method comprising:
   obtaining access to a pie chart that includes a plurality of labels, wherein each label of the plurality of labels:
      is connected to a respective wedge of the pie chart by way of a respective leader line having an extension segment and an angle segment, and
      is disposed on a left side or a right side of the pie chart;
   receiving a notification that a modification is made to the pie chart, wherein the modification causes at least one overlap of at least two labels of the plurality of labels; and
   rearranging at least one label of the plurality of labels to mitigate the at least one overlap, wherein the rearranging comprises:
      when the at least two labels are located in a top half of the pie chart:
         migrating each label of the at least two labels upward, and in a top-down order, to eliminate the at least one overlap, wherein a bottom-most label of the at least two labels is excepted from the migration, and
      when the at least two labels are located in a bottom half of the pie chart:
         migrating each label of the at least two labels downward, and in a bottom-up order, to eliminate the at least one overlap, wherein a top-most label of the at least two labels is excepted from the migration.

2. The method of claim 1, further comprising:
   when a first additional overlap occurs between (i) a bottom-most label of the top half of the left side of the pie chart, and (ii) a top-most label of the bottom half of the left side of the pie chart:
      migrating (i) the bottom-most label, and all labels disposed above (i) the bottom-most label, in an upward direction, and
      migrating (ii) the top-most label, and all labels disposed below (ii) the top-most label, in a downward direction, to eliminate the first additional overlap; and
   when a second additional overlap occurs between (iii) a bottom-most label of the top half of the right side of the pie chart, and (iv) a top-most label of the bottom half of the right side of the pie chart:
   migrating (iii) the bottom-most label, and all labels disposed above (iii) the bottom-most label, in an upward direction, and
   migrating (iv) the top-most label, and all labels disposed below (iv) the top-most label, in a downward direction, to eliminate the second additional overlap.

3. The method of claim 1, wherein, for each label of the plurality of labels:
   the extension segment of the respective leader line extends from the label horizontally, and
   the extension segment of the respective leader line has a length such that the angle segment of the respective leader line is at a zero, forty, or ninety degree angle relative to the extension segment of the respective leader line.

4. The method of claim 1, wherein each label of the plurality of labels is designated as a left-sided label or a right-sided label based on a mid-angle of the wedge that is disposed equidistantly from each straight edge of the wedge.

5. The method of claim 4, wherein a respective default position for the respective leader line of each label of the plurality of labels is based on the mid-angle of the respective wedge.

6. The method of claim 5, further comprising, subsequent to performing the migrations:
   redrawing leader lines where appropriate to reflect the migrations.

7. The method of claim 5, wherein, for each label of the plurality of labels, the angle segment of the respective leader line satisfies a threshold length.

8. The method of claim 7, further comprising:
   for each label of the plurality of labels that is disposed within the left side of the top half of the pie chart having a respective leader line whose angle segment does not satisfy the threshold length:
      shifting the label, and all labels disposed above the label, in an upward direction until the threshold length is satisfied;
   for each label of the plurality of labels that is disposed within the right side of the top half of the pie chart having a respective leader line whose angle segment does not satisfy the threshold length:
      shifting the label, and all labels disposed above the label, in an upward direction until the threshold length is satisfied.

9. The method of claim 7, further comprising:
   for each label of the plurality of labels that is disposed within the left side of the bottom half of the pie chart having a respective leader line whose angle segment does not satisfy the threshold length:
      shifting the label, and all labels disposed below the label, in a downward direction until the threshold length is satisfied;
   for each label of the plurality of labels that is disposed within the right side of the bottom half of the pie chart having a respective leader line whose angle segment does not satisfy the threshold length:
      shifting the label, and all labels disposed below the label, in a downward direction until the threshold length is satisfied.

10. At least one non-transitory computer readable storage medium configured to store instructions that, when executed by at least one processor included in a computing device, cause the computing device to automatically distribute labels associated with pie charts to prevent overlaps of the labels, by carrying out steps that include:
   obtaining access to a pie chart that includes a plurality of labels, wherein each label of the plurality of labels:
      corresponds to a respective wedge of the pie chart by way of a respective leader line having an extension segment and an angle segment, and
      is disposed on a left side or a right side of the pie chart;
   receiving a notification that a modification is made to the pie chart, wherein the modification causes at least one overlap of at least two labels of the plurality of labels; and
   rearranging at least one label of the plurality of labels
   to mitigate the at least one overlap, wherein the rearranging comprises:
   when the at least two labels are located in a top half of the pie chart:
      migrating each label of the at least two labels upward, and in a top-down order, to eliminate the at least one overlap, wherein a bottom-most label of the at least two labels is excepted from the migration; and
   when the at least two labels are located in a bottom half of the pie chart:
      migrating each label of the at least two labels downward, and in a bottom-up order, to eliminate the at least one overlap, wherein a top-most label of the at least two labels is excepted from the migration.

11. The at least one non-transitory computer readable storage medium of claim 10, wherein the steps further include:
   when a first additional overlap occurs between (i) a bottom-most label of the top half of the left side of the pie chart, and (ii) a top-most label of the bottom half of the left side of the pie chart:
      migrating (i) the bottom-most label, and all labels disposed above (i) the bottom-most label, in an upward direction, and
      migrating (ii) the top-most label, and all labels disposed below (ii) the top-most label, in a downward direction, to eliminate the first additional overlap; and
   when a second additional overlap occurs between (iii) a bottom-most label of the top half of the right side of the pie chart, and (iv) a top-most label of the bottom half of the right side of the pie chart:
      migrating (iii) the bottom-most label, and all labels disposed above (iii) the bottom-most label, in an upward direction, and
      migrating (iv) the top-most label, and all labels disposed below (iv) the top-most label, in a downward direction, to eliminate the second additional overlap.

12. The at least one non-transitory computer readable storage medium of claim 10, wherein, for each label of the plurality of labels:
   the extension segment of the respective leader line extends from the label horizontally, and
   the extension segment of the respective leader line has a length such that the angle segment of the respective leader line is at a zero, forty, or ninety degree angle relative to the extension segment of the respective leader line.

13. The at least one non-transitory computer readable storage medium of claim 12, wherein each label of the plurality of labels is designated as a left-sided label or a right-sided label based on a mid-angle of the wedge that is disposed equidistantly from each straight edge of the wedge.

14. The at least one non-transitory computer readable storage medium of claim 13, wherein a respective default position for the respective leader line of each label of the plurality of labels is based on the mid-angle of the respective wedge.

15. The at least one non-transitory computer readable storage medium of claim 14, wherein the steps further include, subsequent to performing the migrations:
   redrawing leader lines where appropriate to reflect the migrations.

16. The at least one non-transitory computer readable storage medium of claim 14, wherein, for each label of the plurality of labels, the angle segment of the respective leader line satisfies a threshold length.

17. A computing device configured to automatically distribute labels associated with pie charts to prevent overlaps of the labels, the computing device comprising:
   at least one processor; and
   at least one memory configured to store instructions that, when executed by the at least one processor, cause the computing device to:
      obtain access to a pie chart that includes a plurality of labels, wherein each label of the plurality of labels:
         is connected to a respective wedge of the pie chart by way of a respective leader line having an extension segment and an angle segment, and is disposed on a left side or a right side of the pie chart;
      receive a notification that a modification is made to the pie chart, wherein the modification causes at least one overlap of at least two labels of the plurality of labels; and
   rearrange at least one label of the plurality of labels to mitigate the at least one overlap, wherein the rearranging comprises:
      when the at least two labels are located in a top half of the pie chart:
         migrating each label of the at least two labels upward, and in a top-down order, to eliminate the at least one overlap, wherein a bottom-most label of the at least two labels is excepted from the migration, and
      when the at least two labels are located in a bottom half of the pie chart:
         migrating each label of the at least two labels downward, and in a bottom-up order, to eliminate the at least one overlap, wherein a top-most label of the at least two labels is excepted from the migration.

18. The computing device of claim 17, wherein the at least one processor further causes the computing device to:
   when a first additional overlap occurs between (i) a bottom-most label of the top half of the left side of the pie chart, and (ii) a top-most label of the bottom half of the left side of the pie chart:
      migrate (i) the bottom-most label, and all labels disposed above (i) the bottom-most label, in an upward direction, and
      migrate (ii) the top-most label, and all labels disposed below (ii) the top-most label, in a downward direction, to eliminate the first additional overlap; and
   when a second additional overlap occurs between (iii) a bottom-most label of the top half of the right side of the pie chart, and (iv) a top-most label of the bottom half of the right side of the pie chart:
      migrate (iii) the bottom-most label, and all labels disposed above (iii) the bottom-most label, in an upward direction, and
      migrate (iv) the top-most label, and all labels disposed below (iv) the top-most label, in a downward direction, to eliminate the second additional overlap.

19. The computing device of claim 17, wherein, for each label of the plurality of labels:
   the extension segment of the respective leader line extends from the label horizontally, and
   the extension segment of the respective leader line has a length such that the angle segment of the respective leader line is at a zero, forty, or ninety degree angle relative to the extension segment of the respective leader line.

20. The computing device of claim 19, wherein each label of the plurality of labels is designated as a left-sided label or a right-sided label based on a mid-angle of the wedge that is disposed equidistantly from each straight edge of the wedge.

* * * * *

UNITED STATES PATENT AND TRADEMARK OFFICE
CERTIFICATE OF CORRECTION

PATENT NO. : 11,074,726 B2
APPLICATION NO. : 15/718787
DATED : July 27, 2021
INVENTOR(S) : Elizaveta Girsova et al.

It is certified that error appears in the above-identified patent and that said Letters Patent is hereby corrected as shown below:

In the Claims

In Claim 10, at Column 14, Line 5: "corresponds to a respective wedge of the pie chart by" should read -- is connected to a respective wedge of the pie chart by --.

Signed and Sealed this
Thirty-first Day of May, 2022

Katherine Kelly Vidal
*Director of the United States Patent and Trademark Office*